Oct. 18, 1927.
H. H. FRICK
POWER TRANSMITTING MEANS
Filed Aug. 2, 1926
1,645,746
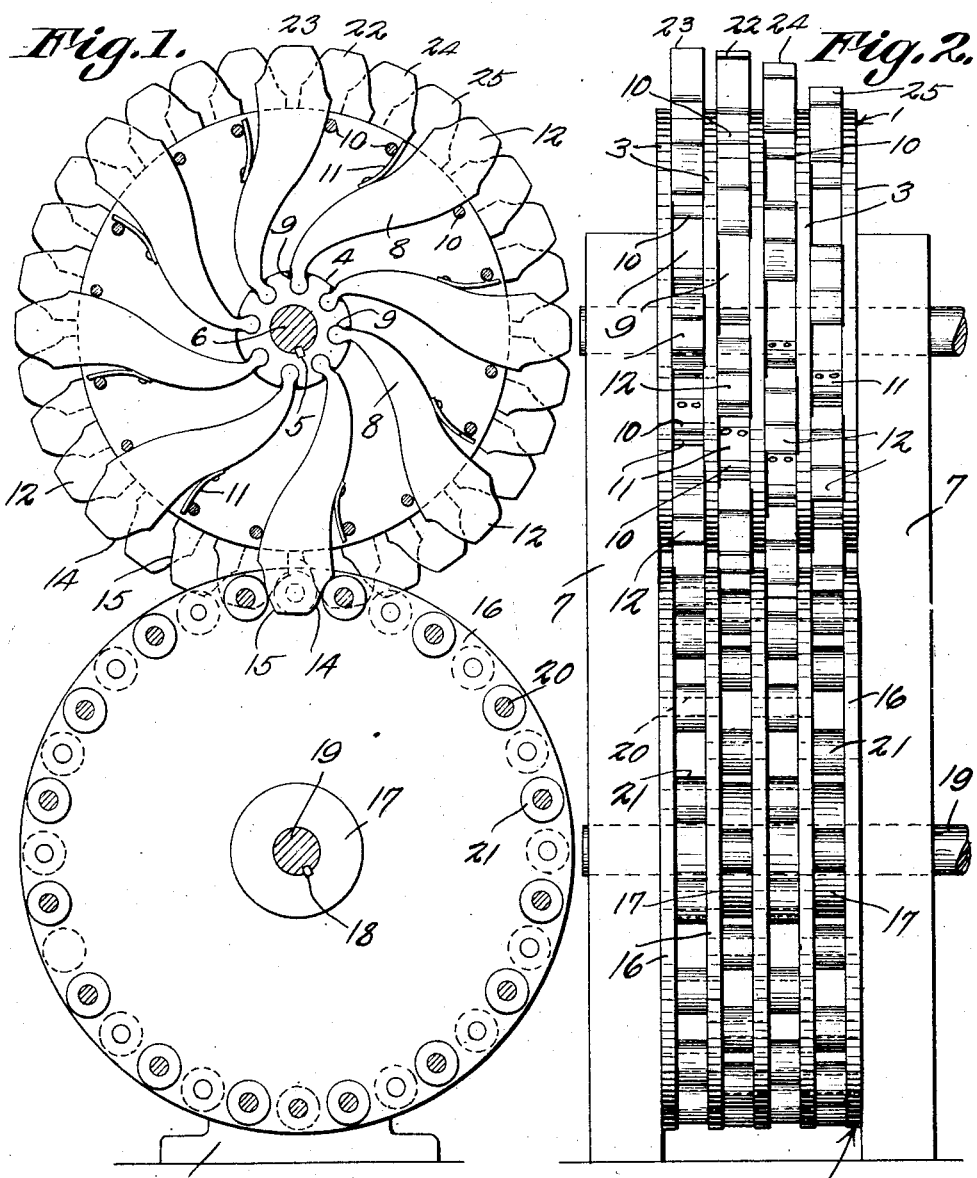
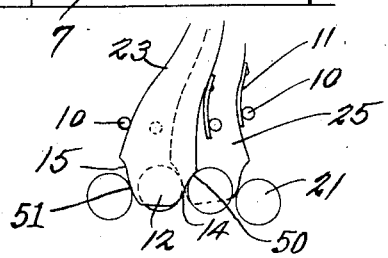
H. H. Frick
Inventor,
By C. A. Snow & Co.
Attorneys.

Patented Oct. 18, 1927.

1,645,746

UNITED STATES PATENT OFFICE.

HENRY H. FRICK, OF FRICKS, PENNSYLVANIA.

POWER-TRANSMITTING MEANS.

Application filed August 2, 1926. Serial No. 126,532.

This invention aims to provide novel means for transmitting power advantageously, and, especially, to provide rotatable driving and driven gear members, the teeth of which cooperate in a novel way.

It is within the province of the disclosure to improve generally and to enhance the utility of devices of that type to which the invention appertains.

Although a preferred form of the invention has been shown, it should be understood that the drawings illustrate a machine which, within the scope of what is claimed, a mechanic may change, without departing from the spirit of the invention.

In the drawings:—

Figure 1 shows in section, a device constructed in accordance with the invention;

Figure 2 is an elevation; and

Figure 3 is a diagrammatic view relating to the operation of the teeth.

The device includes a driving member and a driven member, the driving member being marked by the numeral 1 in Figure 2, and the driven member being marked by the numeral 2 in that figure. The driving member 1 preferably embodies a plurality of disks 3 between which are located hubs 4, the disks and the hubs being secured at 5 to a shaft 6 which is supported for rotation in bearings 7. Arms 8 are supported at 9 in the hubs 4 for swinging movement between connecting pins 10 which are mounted in adjacent disks 3. Each arm 8 has a spring tongue 11 which cooperates with one of the pins 10, the arm bearing immediately upon the other pin 10. Each arm terminates at its outer end in a tooth 12 having a reversely curved forward driving edge 14, and a reversely curved rear edge 15.

The driven member 2 includes a plurality of disks 16 the hubs 17 of which are secured at 18 to a shaft 19 journaled in the bearings 7. The disks 16 are connected by shafts 20 on which roller teeth 21 are journaled, the teeth 12 of the member 1 being adapted to engage between the roller teeth 21 of the member 2. The teeth 12 of the various sets (shown in Figure 2) are not in alinement longitudinally of the member 1, but are advanced progressively, one with respect to another; that is, any tooth in the second set, for instance the tooth marked by the numeral 22 in Figure 2, is a little in advance of the corresponding tooth 23 of the first set, the corresponding tooth 24 of the third set is in advance of the tooth 22, and the tooth 25 of the fourth set is in advance of the tooth 24, as will be understood when Figures 2 and 1 are compared. The pairs of roller teeth 21 in the driven member 2 are of course arranged accordingly.

When any tooth 12 of the member 1 is between a pair of roller teeth 21 on the member 2, as in Figure 1, the edge 14 of the tooth cooperates with one of the roller teeth 21 to impart rotation to the driven member 2, the said tooth 21 rolling on its shaft 20, and the edge 15 of the tooth 12 being so constructed as to clear the rear roller tooth 21 of the pair as the tooth 12 rises out from between the roller teeth 21, and clears them. When the tooth 12 is in driving position, it bears directly against one of the pins 10, but as any tooth 12, with its arm 8, moves toward its final position the spring tongue 11 is compressed. This is illustrated clearly in Figure 3, wherein the tooth 23 is in the position shown in Figure 1, whereas the tooth 25 is in such a position that its spring 11 has been compressed. The spring 11 is a weak spring and has merely strength enough to offset the weight of the arm 8 and hold the arm against the pin 10 when the arm is not engaged with the roller teeth 21.

Owing to the way in which the teeth of the driving members 1 and 2 are set, relatively to each other, and owing to their specific construction, a continuous drive is imparted from the member 1 to the member 2.

The shafts 6 and 19 can of course be supported in any desired way, and the arms 8 may be connected with the hubs 4 in any desired way, for swinging movement; and in general, a mechanic can make many changes instructed by the showing of the drawings, which is illustrative merely.

The driving edge 14 of the tooth 12 bears on one roller tooth 21 at a point 50 which is spaced further from the center of rotation of the member 2 than is the point 51 where the rear edge 15 of the tooth 12 bears on the adjoining roller tooth.

What is claimed is:—

1. In a device of the class described, co-operating members supported for rotation, one of said members having rotatable teeth, the other of said members embodying arms mounted for swinging movement and provided with teeth adapted to engage between the rotatable teeth, the teeth of the arms having reversely curved forward driving edges, and being provided with reversely curved rear edges of greater length than the driving edges, and means for limiting the swinging movement of the arms.

2. In a device of the class described, cooperating members supported for rotation, one of said members having pairs of roller teeth, and the other of said members embodying arms mounted to swing, and means for limiting the swinging movement of the arms, the arms having teeth adapted to engage between the roller teeth, the driving edge of each tooth on the arms bearing upon one roller tooth of each pair at a point spaced further from the center of rotation of the first-specified member than is the point where the rear edge of said tooth engages the other roller of each pair.

3. In a device of the class described, cooperating members supported for rotation, one of said members having pairs of roller teeth, and the other of said members comprising a hub and arms having their inner ends mounted pivotally on the hub in spaced relation to the center of rotation of the hub, means for limiting the swinging of the arms, said means comprising projections on said other member, each arm being located between two of the projections, each arm having a spring engaging one projection and holding the arm yieldably in engagement with the other projection, the arms having teeth adapted to engage between the roller teeth, the driving edge of each tooth on the arms bearing upon one roller tooth of each pair at a point spaced further from the center of rotation of the first specified member than is the point where the rear edge of said tooth engages the other roller of each pair.

In testimony that I claim the foregoing as my own, I have hereto affixed my signature.

HENRY H. FRICK.